A. G. RILEY.
CLEVIS.
APPLICATION FILED OCT. 18, 1915.

1,183,117.

Patented May 16, 1916.

Witness
H. C. Rodgers

Inventor
A. G. Riley
By George H. Thorpe
Attorney

UNITED STATES PATENT OFFICE.

ARTHUR G. RILEY, OF KANSAS CITY, KANSAS.

CLEVIS.

1,183,117.  Specification of Letters Patent.  Patented May 16, 1916.

Application filed October 18, 1915. Serial No. 56,600.

*To all whom it may concern:*

Be it known that I, ARTHUR G. RILEY, a citizen of the United States, residing at Kansas City, in the county of Wyandotte and State of Kansas, have invented certain new and useful Improvements in Clevises, of which the following is a specification.

This invention relates to clevises and has for its object to produce a device of that character having a pin which cannot be accidentally disengaged from the clevis and my object is to produce a simple, strong durable and cheap clevis of the character outlined.

To this end the invention consists in certain novel and peculiar features of construction and combination of parts as hereinafter described and claimed; and in order that it may be fully understood reference is to be had to the accompanying drawing, in which—

Figure 1:
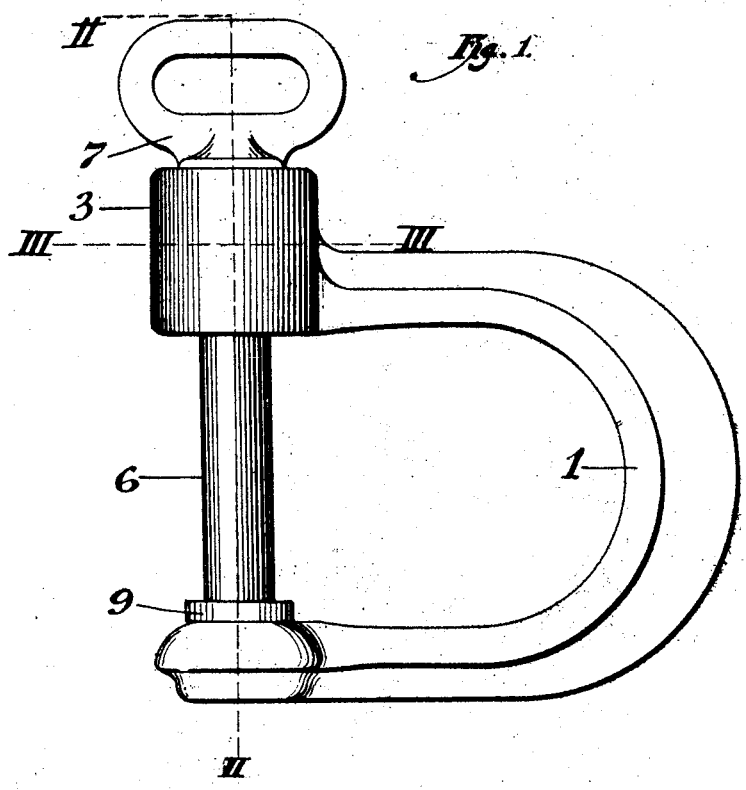
Figure 2:
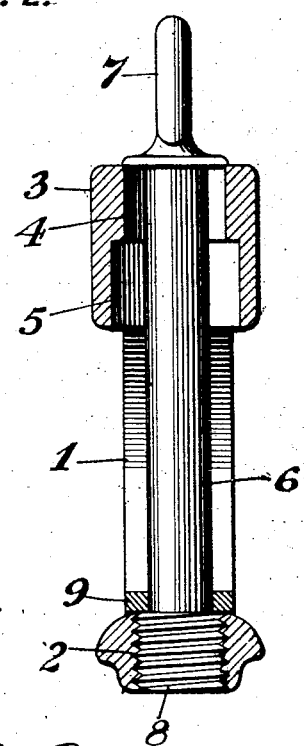
Figure 3:
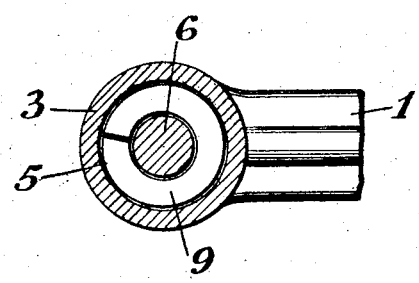

Figure 1, is a side elevation of a clevis embodying my invention. Fig. 2 is a vertical section taken on the line II—II of Fig. 1. Fig. 3, is a horizontal section taken on the line III—III of Fig. 1.

In the said drawing, 1 indicates a horizontally arranged U-shaped clevis provided in the end of its lower arm with a threaded opening 2 and at the end of its upper arm with a boss or enlargement 3 provided with a vertical hole 4 in alinement with and slightly larger than the threaded hole 2, the said hole being formed at its lower end with an enlargement 5. The clevis pin 6 is provided with a head 7 incapable of entering hole 4 and with a threaded enlargement 8 at its lower end for engagement with the threaded opening 2, the said threaded portion 8 being of course capable of passing through hole 4.

Fitting slidingly on the bolt is a collar 9, the same being preferably of the split type. A strip of ductile metal preferably is bent around the pin to form said collar after the pin is fitted properly in the clevis and when the pin is raised preliminary to the engagement of the clevis with the object or to the disengagement of the clevis from an object, the collar 9 will occupy the hole enlargement 5, which is preferably of sufficient depth to also receive the threaded portion 8 of the pin.

When an object is engaged with the clevis the collar 9 may occupy the position shown in the drawing or it may rest upon the object engaged by the clevis that is to say it may be engaged with the upper part of the pin and thus be free to drop down upon the engaged object. With this collar in place it is obvious that the pin cannot be withdrawn from the clevis as said collar is of greater diameter than the hole 4 and the only way by which the pin can be removed is to spread the ends of the split collar until it can be disengaged from the pin.

From the above description it will be apparent that I have produced a clevis embodying the features of advantage enumerated as desirable in the statement of the object of the invention and it is to be understood that it is of course susceptible of slight modifications without departing from the spirit and scope of the appended claims.

I claim:

1. A clevis provided with alined holes in its ends, the hole in the lower end being a threaded hole and of smaller diameter than the hole in the upper end, a bolt extending through the hole in the upper end of the clevis and provided with a head and at its lower end with an enlarged threaded portion engaging the threaded hole, and a collar fitting slidingly on the bolt between the head and threaded portion thereof.

2. A clevis provided with alined holes in its ends, the hole in the lower end being a threaded hole and of smaller diameter than the hole in the upper end, and the last-named hole being enlarged at its lower end, a bolt extending through the hole in the upper end of the clevis and provided with a head and at its lower end with an enlarged threaded portion engaging the threaded hole, and a collar fitting slidingly on the bolt between the head and threaded portion thereof.

In testimony whereof, I affix my signature.

ARTHUR G. RILEY.